US008891424B2

(12) United States Patent
Park et al.

(10) Patent No.: US 8,891,424 B2
(45) Date of Patent: Nov. 18, 2014

(54) METHOD AND DEVICE FOR MONITORING PAGING MESSAGE

(71) Applicant: LG Electronics Inc., Seoul (KR)

(72) Inventors: Gi Won Park, Anyang-si (KR); Hee Jeong Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 276 days.

(21) Appl. No.: 13/652,135

(22) Filed: Oct. 15, 2012

(65) Prior Publication Data

US 2013/0094418 A1    Apr. 18, 2013

Related U.S. Application Data

(60) Provisional application No. 61/547,741, filed on Oct. 16, 2011, provisional application No. 61/550,460, filed on Oct. 24, 2011.

(51) Int. Cl.
| | |
|---|---|
| *H04W 4/00* | (2009.01) |
| *H04W 68/02* | (2009.01) |
| *H04W 84/22* | (2009.01) |
| *H04W 88/18* | (2009.01) |
| *H04W 52/02* | (2009.01) |

(52) U.S. Cl.
CPC ............ *H04W 68/025* (2013.01); *H04W 4/005* (2013.01); *H04W 52/0235* (2013.01)
USPC ........ 370/311; 370/318; 370/328; 455/426.1; 455/458; 455/515

(58) Field of Classification Search
USPC ...................... 455/426.1, 458, 515
See application file for complete search history.

(56) References Cited

U.S. PATENT DOCUMENTS

| | | | |
|---|---|---|---|
| 8,737,305 B2 * | 5/2014 | Cho et al. ................ | 370/328 |
| 8,774,849 B2 * | 7/2014 | Cho et al. ................ | 455/515 |
| 8,811,290 B2 * | 8/2014 | Park et al. ............... | 370/328 |
| 2011/0223942 A1 * | 9/2011 | Xu et al. ................. | 455/458 |
| 2013/0260801 A1 * | 10/2013 | Kim et al. .............. | 455/458 |

OTHER PUBLICATIONS

Marks et al., Enhancements to Support Machine-to-Machine Applications, May 25, 2011, IEEE 802.16p-10/0018r2.*
Lin et al., Addressing for M2M Devices and Corresponding Masking Schemes of A-A-MAP IEs, Mar. 14, 2011, IEEE 802.16p-11/0028r2.*
Li et al., Idle mode optimizations for fixed M2M devices, Jul. 20, 2011, IEEE C802.16p-11/0202r2.*

* cited by examiner

*Primary Examiner* — Andrew Chriss
*Assistant Examiner* — John Lequang
(74) *Attorney, Agent, or Firm* — Mckenna Long & Aldridge LLP

(57) ABSTRACT

A method and device for monitoring a paging message in Machine To Machine (M2M) communication are provided. A M2M device receives a segment of the paging message that includes an extension flag and a M2M extension flag. The extension flag indicates that the M2M device checks the M2M extension flag and the M2M extension flag indicates whether a remaining segment of the paging message exists.

14 Claims, 8 Drawing Sheets

METHOD AND DEVICE FOR MONITORING PAGING MESSAGE

CROSS-REFERENCE TO RELATED APPLICATIONS

This application claims the benefit of priority of U.S. Provisional applications 61/547,741 filed on Oct. 16, 2011, and 61/550,460 filed on Oct. 24, 2011, all of which are incorporated by reference in their entirety herein.

BACKGROUND OF THE INVENTION

1. Field of the Invention

The present invention relates to wireless communications, and more particularly, to method and device for monitoring a paging message in Machine To Machine (M2M) communication.

2. Related Art

Machine To Machine (M2M) communication is one type of data communication including one or more entities not requiring human interactions. M2M communication may also be called as Machine Type Communication (MTC). That is, the M2M communication refers to the concept of communication based on the existing wireless communication network used by a machine device instead of a mobile station operated by a human. The machine device used in the M2M communication can be called a M2M device. There are various M2M devices such as a vending machine, a machine of measuring a water level at a dam, etc.

The M2M device has a feature different from that of a typical mobile station. Therefore, a service optimized to the M2M communication may differ from a service optimized to human-to-human communication. In comparison with a current mobile network communication service, the M2M communication can be characterized as a different market scenario, data communication, less costs and efforts, a potentially great number of M2M devices, wide service areas, low traffic for each M2M device, etc.

An idle mode is a mode in which a wireless device wakes up only during a specific duration to transmit or receive data in order to save battery consumption. A network re-entry process is a process in which the wireless device in the idle mode is recovered to a connected state with respect to a network.

It is required to consider the M2M communication feature in the operation of the M2M device in the idle mode.

SUMMARY OF THE INVENTION

The present invention provides a method and device for monitoring a paging message in Machine To Machine (M2M) communication.

In an aspect, a method for monitoring a paging message in Machine To Machine (M2M) communication is provided. The method may be performed by a M2M device operating in an idle mode comprising a paging listening interval and a paging unavailable interval. The method includes receiving a segment of the paging message during the paging listening interval, the received segment of the paging message comprising an extension flag and a M2M extension flag, the extension flag indicating that the M2M device checks the M2M extension flag, the M2M extension flag indicating whether a remaining segment of the paging message exists, and if the M2M extension flag indicates an existence of the remaining segment of the paging message, monitoring at least one subsequent subframe to receive the remaining segment of the paging message while the M2M device remains awake.

The method may further include returning to the paging unavailable interval if an identifier of the M2M device is not found in a last segment of the paging message.

The method may further include not monitoring a subsequent subframe if the M2M extension flag indicates non-existence of the remaining segment of the paging message.

The extension flag may be set to 0b0 to indicate that the M2M device checks the M2M extension flag.

The M2M extension flag may be set to 0b1 to indicate that the remaining segment of the paging message exists.

The M2M extension flag may be set to 0b0 to indicate that the received segment is the last segment of the paging message.

In another aspect, a wireless device for Machine To Machine (M2M) communication configured for operating in an idle mode comprising a paging listening interval and a paging unavailable interval is provided. The wireless device includes a radio frequency unit for receiving and transmitting a radio signal, and a processor operatively coupled with the radio frequency unit and configured to receive a segment of the paging message during the paging listening interval, the received segment of the paging message comprising an extension flag and a M2M extension flag, the extension flag indicating that the wireless device checks the M2M extension flag, the M2M extension flag indicating whether a remaining segment of the paging message exists, and if the M2M extension flag indicates an existence of the remaining segment of the paging message, monitor at least one subsequent subframe to receive the remaining segment of the paging message while the wireless device remains awake.

DESCRIPTION OF EXEMPLARY EMBODIMENTS

Figure 1:
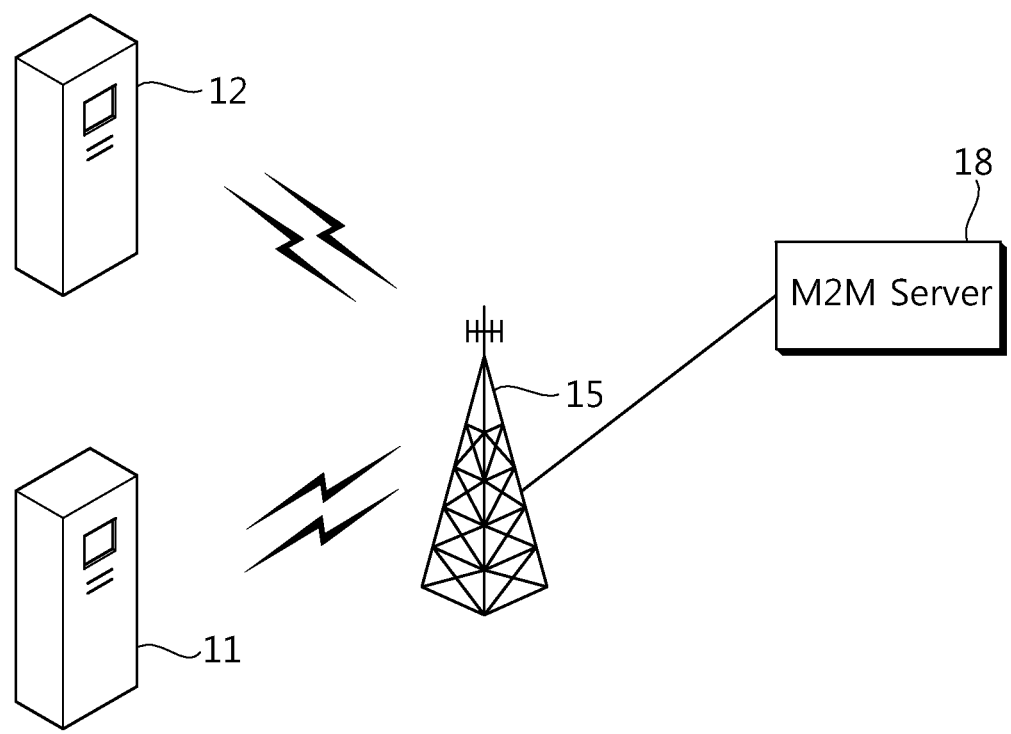
FIG. 1 shows an example of M2M (Machine To Machine) communication.

FIG. 1 shows an example of M2M (Machine To Machine) communication.

The M2M communication is also called a Machine Type Communication (MTC), and refers to information exchange between M2M devices 11 and 12 via a Base Station (BS) 15 without human interactions and information exchange between the M2M device 11 and a M2M server 18 via the BS.

The M2M server 18 is an entity for communicating with the M2M device 11. The M2M server executes a M2Mapplication, and provides a M2M-specific service to the M2M device 11.

The M2M device 11 is a wireless device for providing the M2M communication, and may be fixed or mobile. The M2M device is also called a MTC device.

A mobile station (MS) is a wireless device that does not support M2M communication. The MS may also be called a Human Type Communication (HTC) device.

A service provided using the M2M communication may be differentiated from the existing communication service requiring human intervention, and its service range is various, such as tracking, metering, payment, medical field services, remote controlling, etc.

Representative examples of individual service requirements of M2M features may be as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device can delay data delivery. If a network load is greater than a pre-determined load threshold, a network operator can restrict network access of the M2M device or data transmission to another MTC device, and can dynamically restrict an amount of data that can be delivered by the MTC device in a specific region.

3) Offline indication feature: This is a case in which a notification is requested to the M2M device at a proper time when signaling is no longer possible between the M2M device and the network.

4) PAM (Priority Alarm Message) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing user equipment identifiers, and thus the following identifier is taken into account.

Station identifier (STID): The STID is used to identify the M2M devices in the domain of the BS. The BS may assign the same STID to multiple M2M devices.

M2M Group Identifier (MGID): The MGID is a 12-bit value that uniquely identifies a downlink multicast service flow shared by a group of M2M devices within an M2M Group Zone. The M2M Group Zone is a logical zone comprising one or more BSs. An M2M Group Zone is identified by a M2M GROUP ZONE ID. The MGID may be assigned during dynamic service addition (DSA) procedure. The assigned MGID may be retained by the M2M device even in idle state unless the M2M device exits from the network or the network explicitly deletes the service flow associated with the MGID.

Fixed M2M Deregistration Identifier (FMDID): The FMDID is a 16-bit value that uniquely identifies a M2M device in domain of the BS. The FMDID is assigned to the M2M device by the BS during idle mode entry and released during the network reentry.

Deregistration identifier (DID): The DID is a 18-bit value used to identify a device in an idle mode within the set of paging group ID, paging cycle and paging offset. The network may assign the DID to each device during idle mode initiation.

Now, the idle mode operation in an IEEE 802.16m-based system will be described with reference to section 6.2.18 of Institute of Electrical and Electronics Engineers (IEEE) P802.16 m/D10 "Part 16: Air Interface for Broadband Wireless Access Systems: Advanced Air Interface" released at Nov. 24, 2010. However, a wireless communication system to which the present invention is applied is not limited to the IEEE 802.16m-based system. Thus, the present invention is also applicable to various wireless communication systems such as 3GPP (3rd Generation Partnership Project) LTE (Long Term Evolution), etc.

Figure 2:
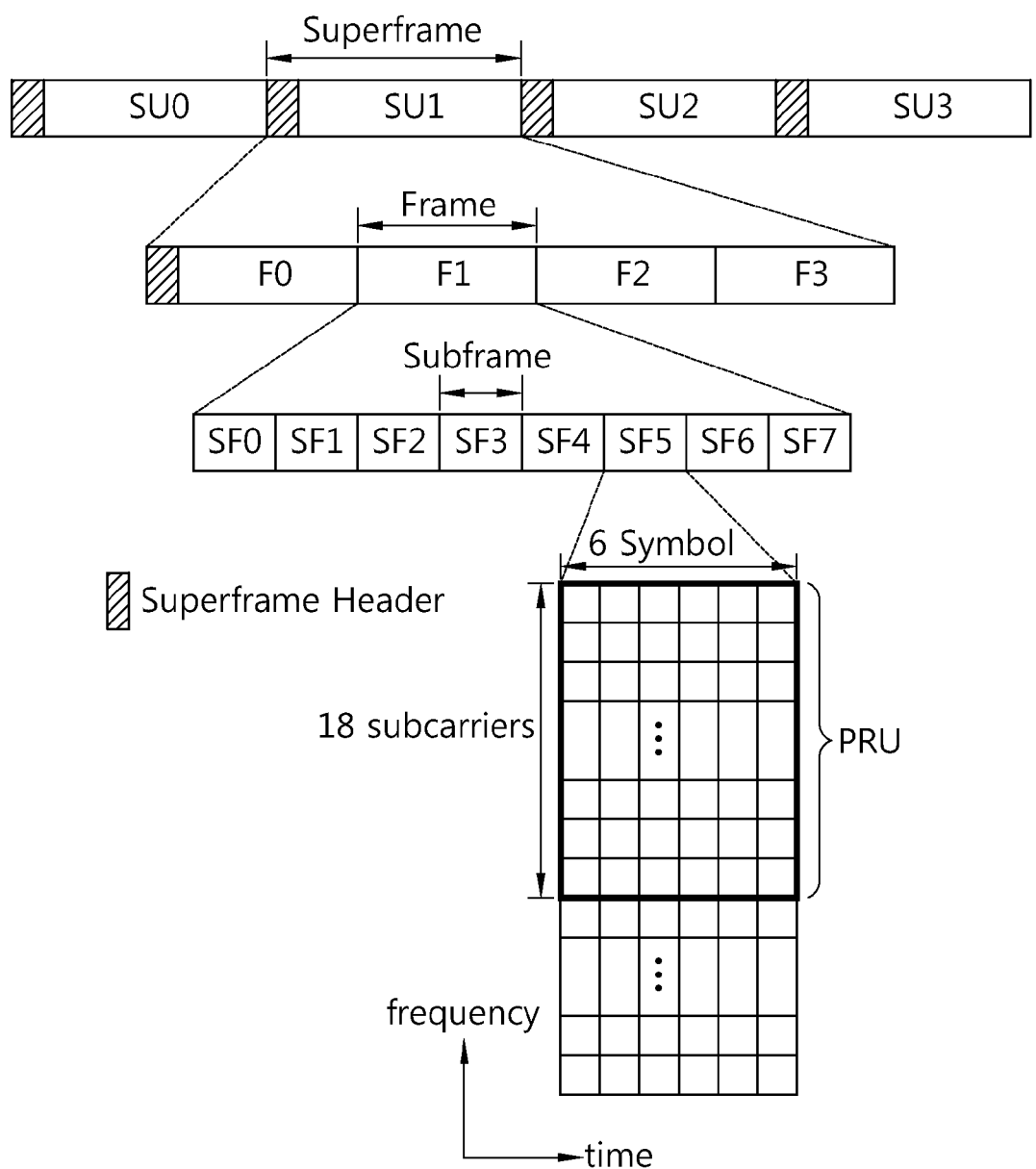
FIG. 2 shows an exemplary frame structure of an IEEE 802.16m system.

FIG. 2 shows an exemplary frame structure of an IEEE 802.16m system.

A Superframe (SF) includes a Superframe Header (SFH) and four frames F0, F1, F2, and F3. Each frame may have the same length in the SF. A size of the SF is 20 ms, and a size of each frame is 5 ms.

The frame includes a plurality of subframes SF0, SF1, SF2, SF3, SF4, SF5, SF6, and SF7. The subframe can be used for uplink transmission or downlink transmission. The subframe includes a plurality of Orthogonal Frequency Division Multiplexing (OFDM) symbols in a time domain. The OFDM symbol is for expressing one symbol period, and there is no limitation in a multiple access scheme or terminologies The subframe includes 6 OFDM symbols. This is for exemplary purposes only. The subframe may include 5, 7, or 9 OFDM symbols, and the present invention is not limited thereto.

A subframe type can be defined according to the number of OFDM symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols.

A Time Division Duplex (TDD) scheme or a Frequency Division Duplex (FDD) scheme can be applied to the frame. Subframes included in a TDD frame can be divided into uplink subframes and downlink subframes.

The size of the SF, the number of frames included in the SF, the number of subframes included in the frame, and the number of OFDM symbols included in the subframe may change, and the present invention is not limited thereto.

The SFH can carry an essential system parameter and system configuration information. The SFH can be transmitted in the last 5 OFDM symbols of the first subframe included in the SF.

A Physical Resource Unit (PRU) is a basic resource assignment unit, and includes 18 subcarriers in consecutive OFDM symbols in the same subframe.

In conventional IEEE 802.16 system, an Advanced-MAP (A-MAP) carries service control information. A non-user specific A-MAP carries information which is not limited to a specific user or a specific user group. A Hybrid Automatic Repeat Request (HARQ) Feedback A-MAP carries HARQ ACK/NACK information regarding uplink data transmission. A Power Control A-MAP carries a power control command for a mobile station (MS).

An Assignment A-MAP carries resource assignment information. The Assignment A-MAP includes several types of A-MAPs, such as a Downlink (DL) Basic Assignment A-MAP, a Uplink (UL) Basic Assignment A-MAP, a Code Division Multiple Access (CDMA) Allocation A-MAP, etc.

The CDMA Allocation A-MAP includes a UL resource assignment based on a band request or a UL resource assignment based on a ranging request.

All A-MAPs share a physical resource region called an A-MAP region. The A-MAP region exists in each DL subframe.

Figure 3:
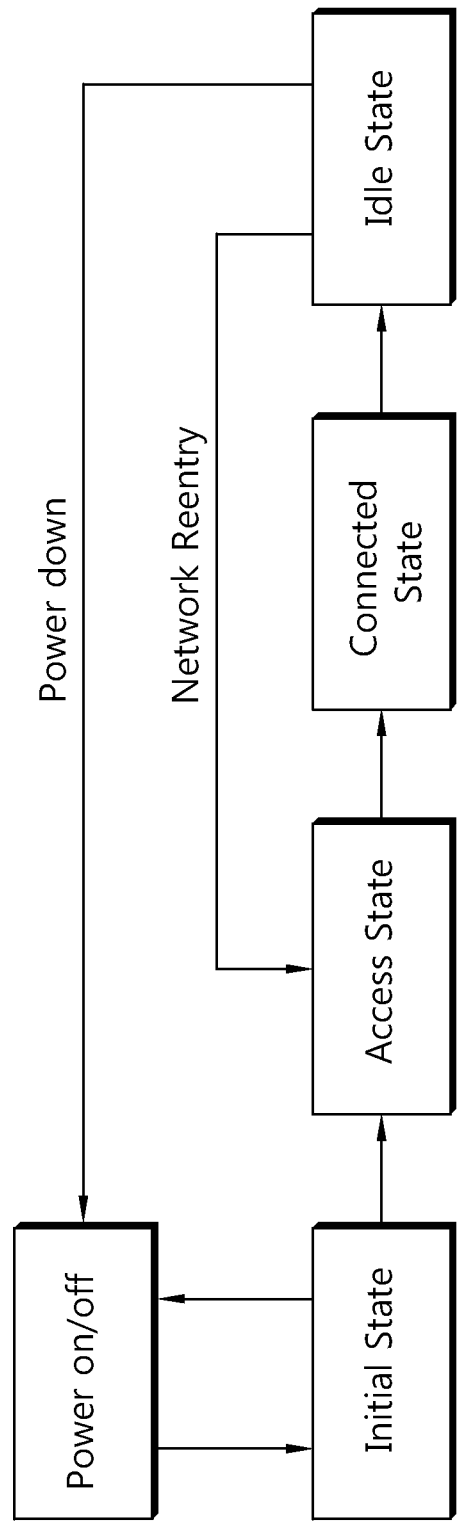
FIG. 3 shows an operation transition diagram in IEEE 802.16m.

FIG. 3 shows an operation transition diagram in IEEE 802.16m.

In an initialization state, a mobile station (MS) performs cell selection by receiving synchronization and system configuration.

In an access state, the MS performs a network entry. The network entry is a process including ranging, basic capability negotiation, and authentication with respect to a BS.

In a connected state, the MS operates in any one of a sleep mode, an active mode, and a scanning mode. During the connected state, the MS maintains a connection established during the connected state. The MS in the active mode can always transmit or receive scheduled data. In the sleep mode, a radio frame is divided into a sleep window and a listening window. The MS in the sleep mode can receive data from the BS during the listening window. The MS in the scanning mode performs measurement instructed by the BS.

In the idle state, the MS operates in the idle mode. The idle mode includes a paging available interval and a paging unavailable interval.

The AMS derives the start of the paging listening interval based on the paging cycle and paging offset. The paging listening interval starts at the superframe whose superframe number N superframe meets the following condition:

$$N_{superframe} \text{ modulo PAGING\_CYCLE=PAGING\_OFFSET}$$

The paging offset is used to determine the superframe within the paging cycle from which the paging listening interval starts. The length of the paging listening interval may be one superframe per paging cycle.

At the beginning of the paging listening interval, the MS may scan and synchronize on the preamble of its preferred BS and decode the P-SFH of the BS.

During a paging unavailable interval, the MS may power down, scan neighbor BSs, select a preferred BS, conduct ranging, or perform other activities for which the MS will not guarantee availability to any ABS for DL traffic.

Figure 4:
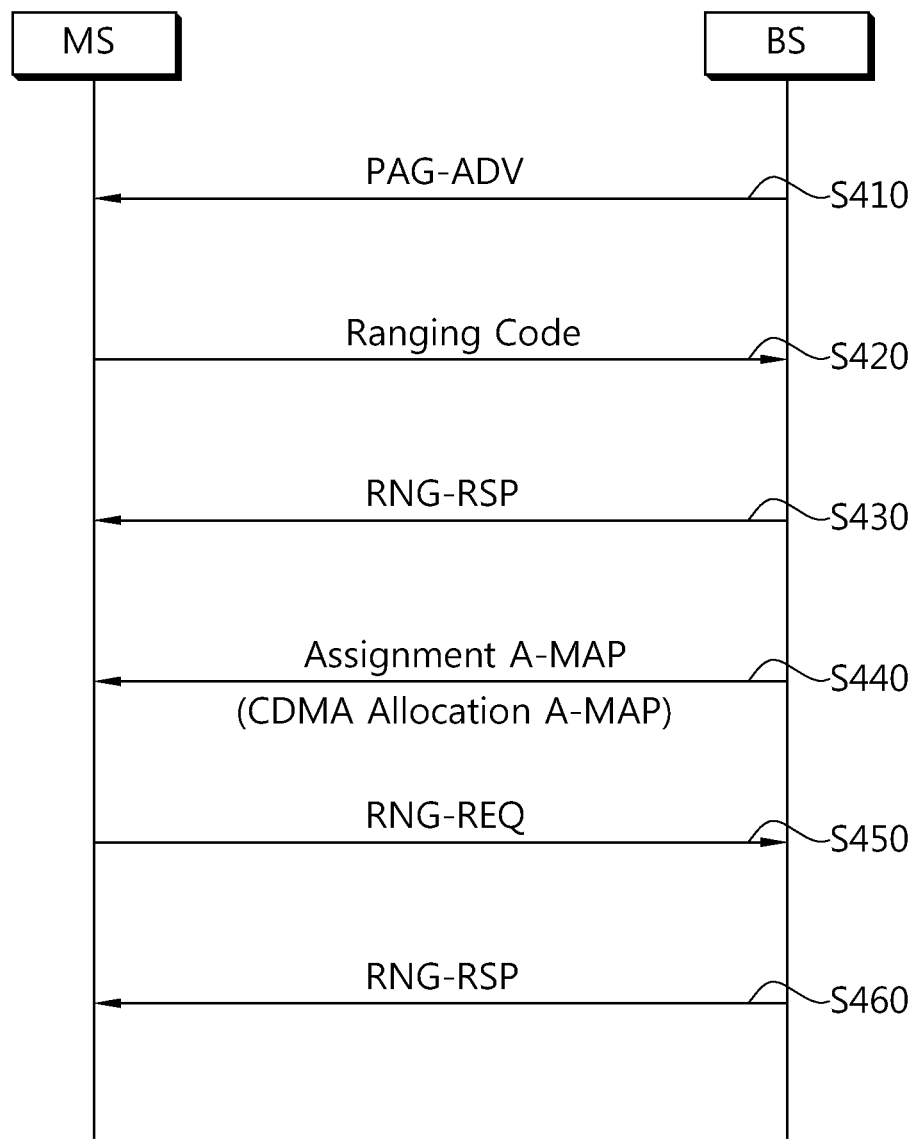
FIG. 4 is a flowchart showing an operation in an idle mode in IEEE 802.16m.

FIG. 4 is a flowchart showing an operation in an idle mode in IEEE 802.16m.

In step S410, in the idle mode, an MS monitors reception of a paging message during a paging available interval, and thus receives a Paging Advertisement (PAG-ADV) message. The PAG-ADV message is a paging massage at IEEE 802.16 and is a notification message for indicating whether there is pending DL traffic to a specific MS. The PAG-ADV message may be one example of a paging message for attempting paging to a M2M device in the idle mode.

By using the PAG-ADV message, a BS can instruct each MS to perform ranging for a network reentry or a location update.

In step S420, when the PAG-ADV message requests the network reentry, the MS ends the idle mode, and transmits a ranging code to the BS.

In step S430, in response to the ranging code, the MS receives a RNG-RSP (Ranging-Response) message from the BS. The RNG-RSP message includes a status code. The status code indicates one of 'continue', 'success', and 'abort'.

If the received RNG-RSP message has the status code of 'continue', the MS retransmits the ranging code.

If the status code is 'success', in step S440, the MS receives an Assignment A-MAP (Advanced-MAP). The Assignment A-MAP includes a CDMA Allocation A-MAP.

The A-MAP is one example of control information for communication between the BS and the MS in the IEEE 802.16-based system. The A-MAP can be called variously, for example, control information, control channels, resource assignment information, etc., according to a wireless communication system.

In step S450, by using a UL resource assignment indicated by the CDMA Allocation A-MAP, the MS transmits a RNG-REQ (Ranging-Request) message to the BS.

In step S460, the MS receives a RNG-RSP message in response to the RNG-REQ message.

Figure 5:
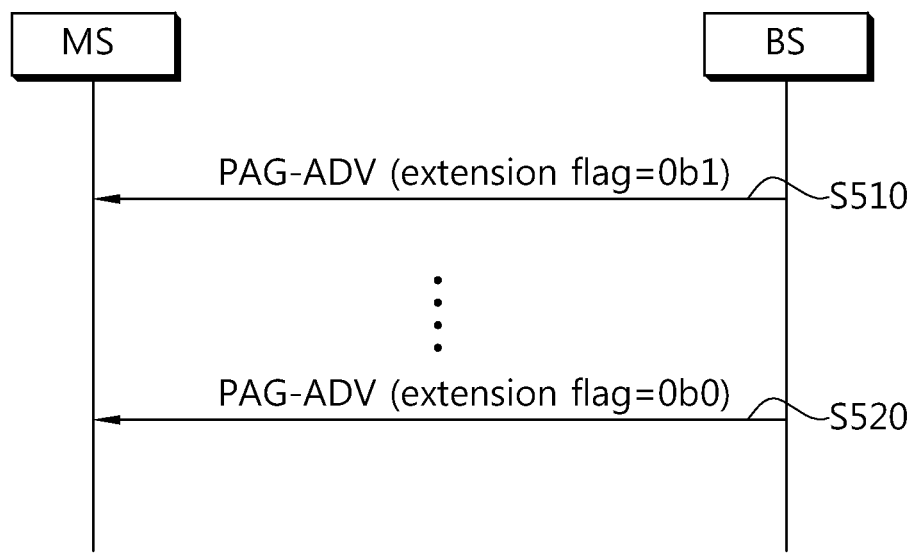
FIG. 5 is a flowchart showing a segmentation of a paging message in IEEE 802.16m.

FIG. 5 is a flowchart showing a segmentation of a paging message in IEEE 802.16m.

IEEE 802.16m supports the segmentation of a PAG-ADV message. The size of the PAG-ADV message may be too large to be transmitted as a single message. For example, a number of paged MSs is two large.

Table 1 shows an exemplary format of a PAG-ADV message.

TABLE 1

| Field | Size (bits) | Description |
| --- | --- | --- |
| For (j=0; j<Num_MSs; j++) { | | Num_MSs indicates the number of paged MSs in a corresponding paging group |
| Deregistration Identifier (DID) | 18 | Used to indicate DID for the MS to be paged (Deregistration Identifier and Paging Cycle are used to identify each paged MS) |
| Paging Cycle | 4 | Used to indicate Paging cycle for the MS to be paged<br>0x00: 4 superframes<br>0x01: 8 superframes<br>0x02: 16 superframes<br>0x03: 32 superframes<br>0x04: 64 superframes<br>0x05: 128 superframes<br>0x06: 256 superframes<br>0x07: 512 superframes<br>0x08-0x15: Reserved |
| Action Code | 1 | Used to indicate the purpose of the PAG-ADV message<br>0b0: perform network reentry<br>0b1: perform ranging for location update |
| } Extension Flag | 1 | Used to indicate the remaining part of the PAG-ADV message exists<br>0b0: This is the last segment of the PAG-ADV message<br>0b1: This is not the last segment of the PAG-ADV message; |

TABLE 1-continued

| Field | Size (bits) | Description |
|---|---|---|
| | | the remaining segments of the message will be transmitted in the subsequent subframes or frames. |

In the table, '0bA' denotes a binary number 'A' and '0xA' denotes a hexadecimal number 'A'.

Using a A-MAP IE, an idle mode MS determines the location of PAG-ADV messages in the subframe(s) of this predetermined frame. The PAG-ADV message may be segmented and these segments are transmitted in different subframes of the predetermined frame. If the segments of the PAG-ADV message cannot be transmitted in the last DL subframe of a frame, then the segments of the PAG-ADV message may be transmitted in the next frame after the predetermined paging frame.

In step S510, if the PAG-ADV message is segmented, a BS may transmit a PAG-ADV message with an extension flag set to 0b1. This PAG-ADV message may be a first segment of the PAG-ADV message. The idle mode MS may remain awake and monitor the subsequent subframe (i.e., next subframe of the subframe where the segment of PAG-ADV message is sent) or frames (i.e., next frame of the frame where the segment of PAG-ADV message is sent) for the remaining segments unless its identifier is already found in the received segments.

In step S520, if the MS receives a PAG-ADV message with an extension flag set to 0b0, the MS receives the complete paging message. The MS may return to paging unavailable interval if the MS is not paged.

If the conventional segmentation of a paging message is adapted to a M2M communication, it may be inefficient to a M2M device.

For example, a paging cycle of a M2M device may be much longer than a paging cycle of a MS in order to minimize the battery consumption of the idle mode M2M device. When the M2M device receives a first paging message with an extension flag set to 0b1, the M2M device remains awake and monitors next segment of the paging message. As a result, the M2M device may remain awake during relatively long paging cycle.

Figure 6:
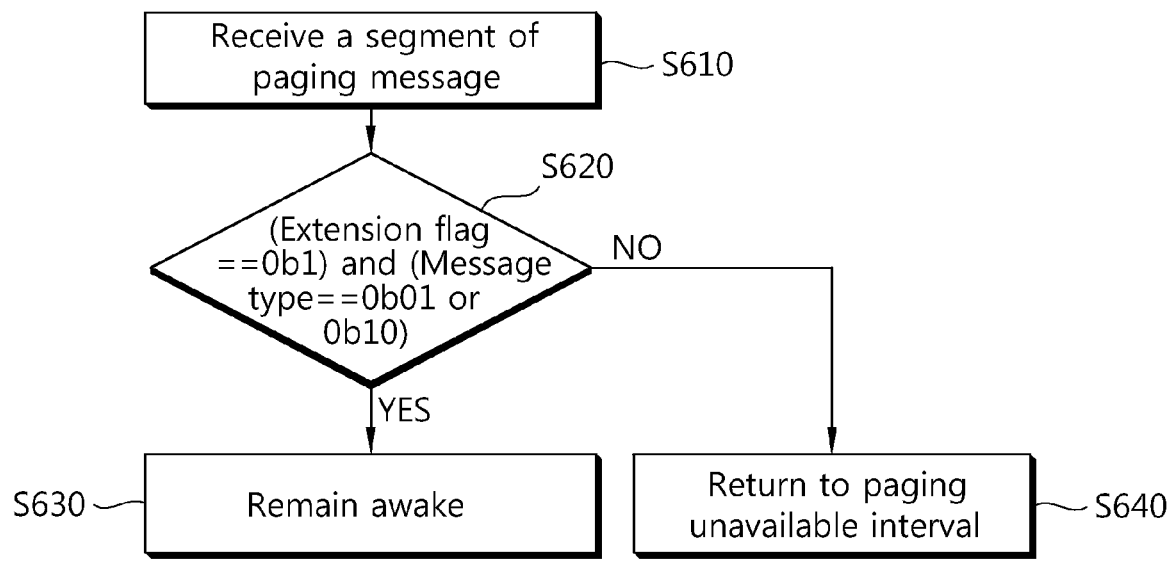
FIG. 6 is a flowchart showing a method of monitoring a paging message according to an embodiment of the present invention.

FIG. 6 is a flowchart showing a method of monitoring a paging message according to an embodiment of the present invention.

In step S610, a M2M device in an idle mode receives a segment of a paging message from a BS after waking up during a paging listening interval.

Table 2 shows an exemplary format of a paging message according to an embodiment of the present invention.

TABLE 2

| Field | Size (bits) | Description |
|---|---|---|
| For (j=0; j<Num; j++) { | | 'Num' indicates the number of paged M2M devices in a corresponding paging group |
| Identifier (ID) | | Used to indicate ID for the M2M device to be paged (ID and Paging Cycle are used to identify each paged M2M device) ID may include at least one of DID, MGID and FMDID. |
| Paging Cycle | 4 | Used to indicate Paging cycle for the M2M device to be paged<br>0x00: 4 superframes<br>0x01: 8 superframes<br>0x02: 16 superframes<br>0x03: 32 superframes<br>0x04: 64 superframes<br>0x05: 128 superframes<br>0x06: 256 superframes<br>0x07: 512 superframes<br>0x08: 32768 superframes<br>0x09: 262144 superframes<br>0x10: 4194304 superframes<br>0x11-0x15: Reserved |
| Action Code | 1 | Used to indicate the purpose of the PAG-ADV message<br>0b0: perform network reentry<br>0b1: perform ranging for location update |
| M2M network access type | 2 | Indicate the network access type for M2M device;<br>0b00: Resource allocation (i.e., Fixed M2M Ranging Assignment A-MAP offset) for RNG-REQ<br>0b01: dedicated ranging channel allocation in PAG-ADV<br>0b10: dedicated ranging channel allocation in broadcast assignment A-MAP IE<br>0b11: No dedicated ranging channel |
| } Extension Flag | 1 | Used to indicate the remaining part of the PAG-ADV message exists<br>0b0: This is the last segment of the PAG-ADV message<br>0b1: This is not the last segment of the PAG-ADV message; the remaining segments of the message will be transmitted in the subsequent subframes or frames. |

TABLE 2-continued

| Field | Size (bits) | Description |
|---|---|---|
| If (Extension Flag==0b1){ | | |
| Message Type | 2 | 0b00: PAG-ADV message includes the only MSs without M2M devices.
0b01: PAG-ADV message includes the only M2M devices without MSs.
0b10: PAG-ADV message includes both MSs and M2M devices.
0b11: reserved |
| } | | |

If the extension flag is set to 0b1, the segment of the paging message may include a message type that indicates this segment is used to page a MS or a M2M device or both.

For example, in step S620, the M2M device checks the message type if the extension flag is set to 0b1.

In step S630, if the message type indicates that the paging message includes an ID of the M2M device (e.g. the M2M is paged), the M2M device remains awake and monitors subsequent subframe or frame to receive a remaining segment of the paging message unless its ID is found in the received segment.

In step S640, if the extension flag is set to 0b0 or the message type is set to 0b00, the M2M device returns to paging unavailable interval.

Even though the extension flag is set to 0b1, the M2M device monitors remaining segments when the paging message includes its ID. Accordingly, unnecessary monitoring by the M2M device can be prevented.

In order to use different segmentation between the MS and the M2M device, there is a need to let the BS know the type of a wireless device during network entry. A Registration-Request (REG-REQ) message and/or a Registration-Response (REG-RSP) message may include a device type as following.

TABLE 3

| Field | Size (bits) | Description |
|---|---|---|
| Device Type | 1 | 0b0: MS
0b1: M2M device |

Figure 7:
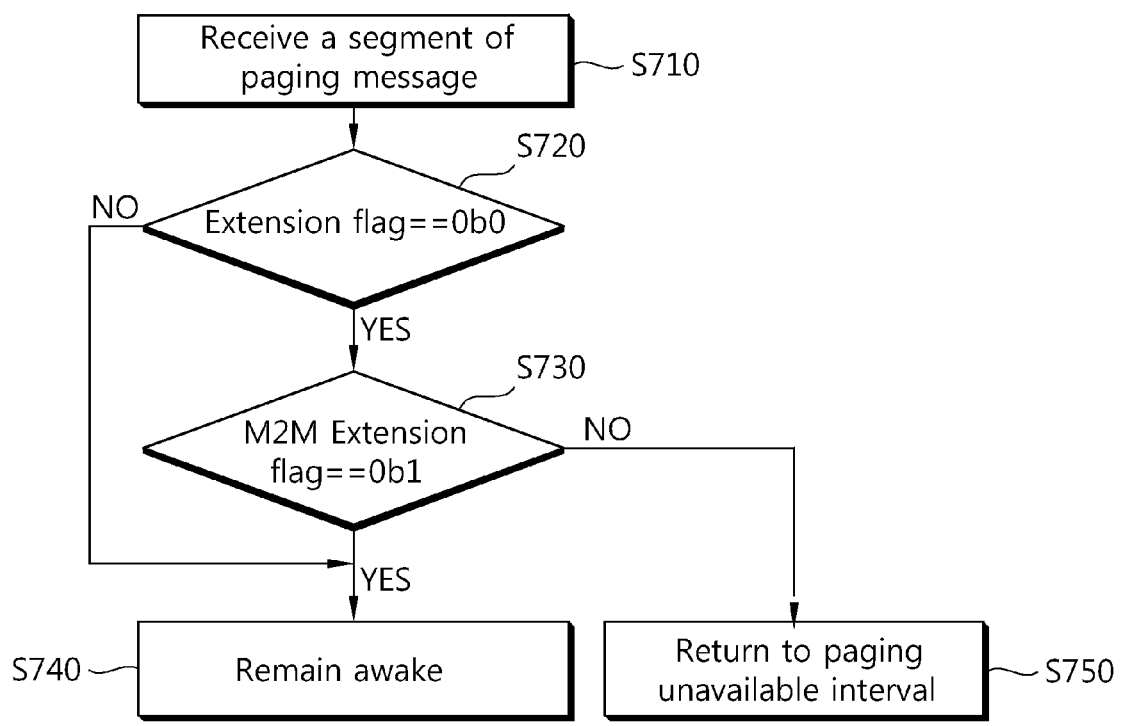
FIG. 7 is a flowchart showing a method of monitoring a paging message according to another embodiment of the present invention.

FIG. 7 is a flowchart showing a method of monitoring a paging message according to another embodiment of the present invention.

In step S710, a M2M device in an idle mode receives a segment of a paging message from a BS after waking up during a paging listening interval.

Table 4 shows an exemplary format of a paging message according to an embodiment of the present invention.

TABLE 4

| Field | Size (bits) | Description |
|---|---|---|
| For (j=0; j<Num; j++) { | | 'Num' indicates the number of paged M2M devices in a corresponding paging group |
| Identifier (ID) | | Used to indicate ID for the M2M device to be paged (ID and Paging Cycle are used to identify each paged M2M device)
ID may include at least one of DID, MGID and FMDID. |
| Paging Cycle | 4 | Used to indicate Paging cycle for the M2M device to be paged
0x00: 4 superframes
0x01: 8 superframes
0x02: 16 superframes
0x03: 32 superframes
0x04: 64 superframes
0x05: 128 superframes
0x06: 256 superframes
0x07: 512 superframes
0x08: 32768 superframes
0x09: 262144 superframes
0x10: 4194304 superframes
0x11-0x15: Reserved |
| Action Code | 1 | Used to indicate the purpose of the PAG-ADV message
0b0: perform network reentry
0b1: perform ranging for location update |
| M2M network access type | 2 | Indicate the network access type for M2M device;
0b00: Resource allocation (i.e., Fixed M2M Ranging Assignment A-MAP offset) for RNG-REQ
0b01: dedicated ranging channel allocation in PAG-ADV
0b10: dedicated ranging channel allocation in broadcast assignment A-MAP IE
0b11: No dedicated ranging channel |
| } | | |
| Extension Flag | 1 | Used to indicate the remaining part of the PAG-ADV message exists
0b0: This is the last segment of the PAG-ADV message
0b1: This is not the last segment of the PAG-ADV |

TABLE 4-continued

| Field | Size (bits) | Description |
|---|---|---|
| | | message; the remaining segments of the message will be transmitted in the subsequent subframes or frames. If there are remaining segments and the remaining segments include only M2M device's paging, this flag is set to 0b0. If this flag is set to 0b0, MS enters the paging unavailable interval and M2M device checks the M2M extension flag. If this flag is set to 0b1, MS and M2M device remains awake and monitor the subsequent subframe unless its ID is found in the received segment. |
| M2M extension flag | 2 | Used to indicate whether the remaining segment of the PAG-ADV message for M2M device exists. 0b0: This is the last segment of the PAG-ADV message 0b1: This is not the last segment of the PAG-ADV message; the remaining segments of the message will be transmitted in the subsequent subframes or frames. This field may be present if the extension flag is set to 0b0 and if there are remaining segments for paging M2M devices only. |

In step S720, the M2M device checks the extension flag. If the extension flag is set to 0b1, the M2M device may remain awake and monitor the subsequent subframe unless its ID is found in the received segment. Otherwise, the M2M device may return the paging unavailable interval.

In step S730, if the extension flag is set to 0b0, the M2M device checks the M2M extension flag.

In step S740, if the M2M extension flag is set to 0b1, the M2M device may remain awake and monitor the subsequent subframe unless its ID is found in the received segment. Otherwise, the M2M device may return the paging unavailable interval.

In step S750, if the M2M extension flag is set to 0b0, the M2M device may return the paging unavailable interval.

If the extension flag indicates that the M2M device checks the M2M extension flag, the M2M device check the M2M extension flag to determine whether the paging message is fragmented. Accordingly, unnecessary monitoring by the M2M device can be prevented and battery consumption due to monitoring can be reduced.

In the above tables, a field name, a size, and a field value are for exemplary purposes only, and thus can be easily modified to other names and other values by those ordinarily skilled in the art. Not all of the fields proposed in the table are essential, and thus a specific field can be omitted.

Figure 8:
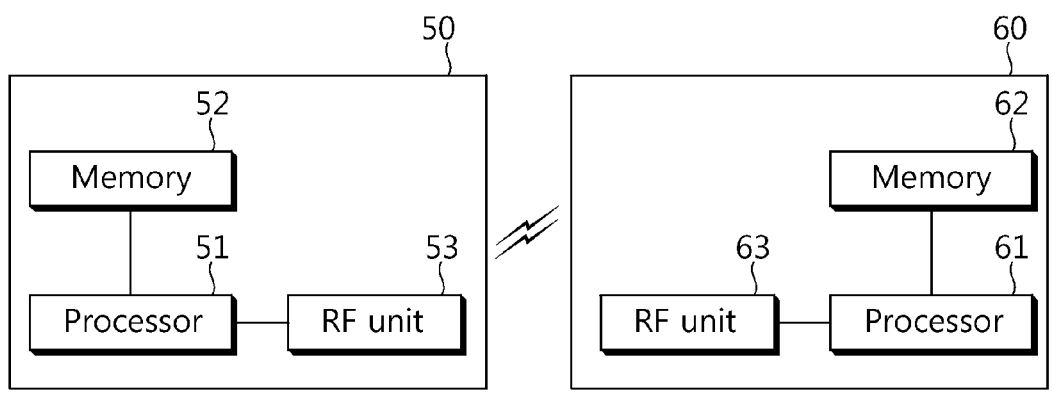
FIG. 8 is a block diagram showing a wireless communication system to implement an embodiment of the present invention.

FIG. 8 is a block diagram showing a wireless communication system to implement an embodiment of the present invention.

A M2M device 50 includes a processor 51, memory 52, and a radio frequency (RF) unit 53. The memory 52 is connected to the processor 51 and configured to store various information used for the operations for the processor 51. The RF unit 53 is connected to the processor 51 and configured to send and/or receive a radio signal. The processor 51 implements the proposed functions, processed, and/or methods. In the described embodiments shown in FIGS. 6 and 7, the operation of the M2M device may be implemented by the processor 51. The processor 51 may monitor segments of a paging message.

A BS 60 includes a processor 61, memory 62, and an RF unit 63. The memory 62 is connected to the processor 61 and configured to store various information used for the operations for the processor 61. The RF unit 63 is connected to the processor 61 and configured to send and/or receive a radio signal. The processor 61 implements the proposed functions, processed, and/or methods. In the described embodiments shown in FIGS. 6 and 7, the operation of the BS may be implemented by the processor 61. The processor 61 may send segments of a paging message.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring a paging message in Machine To Machine (M2M) communication, the method performed by a M2M device operating in an idle mode comprising a paging listening interval and a paging unavailable interval, the method comprising:

receiving a segment of the paging message during the paging listening interval, the received segment of the paging message comprising an extension flag and a M2M extension flag, the extension flag indicating that the M2M device checks the M2M extension flag, the M2M extension flag indicating whether a remaining segment of the paging message exists; and if the M2M extension flag indicates an existence of the remaining segment of the paging message, monitoring at least one subsequent subframe to receive the remaining segment of the paging message while the M2M device remains awake.

2. The method of claim 1, further comprising:
if an identifier of the M2M device is not found until a last segment of the paging message, returning to the paging unavailable interval.

3. The method of claim 1, further comprising:
not monitoring a subsequent subframe if the M2M extension flag indicates non-existence of the remaining segment of the paging message.

4. The method of claim 1, wherein the extension flag is set to 0b0 to indicate that the M2M device checks the M2M extension flag.

5. The method of claim 4, wherein the M2M extension flag is set to 0b1 to indicate that the remaining segment of the paging message exists.

6. The method of claim 5, wherein the M2M extension flag is set to 0b0 to indicate that the received segment is the last segment of the paging message.

7. The method of claim 1, wherein the identifier of the M2M device includes a Fixed M2M Deregistration Identifier (FMDID) that is a 16-bit value that uniquely identifies the M2M device in domain of a base station.

8. A wireless device for Machine To Machine (M2M) communication configured for operating in an idle mode comprising a paging listening interval and a paging unavailable interval, the wireless device comprising:

a radio frequency unit for receiving and transmitting a radio signal; and a processor operatively coupled with the radio frequency unit and configured to:

receive a segment of the paging message during the paging listening interval, the received segment of the paging message comprising an extension flag and a M2M extension flag, the extension flag indicating that the wireless device checks the M2M extension flag, the M2M extension flag indicating whether a remaining segment of the paging message exists; and if the M2M extension flag indicates an existence of the remaining segment of the paging message, monitor at least one subsequent subframe to receive the remaining segment of the paging message while the wireless device remains awake.

9. The wireless device of claim 8, wherein the processor is configured to return to the paging unavailable interval if an identifier of the wireless device is not found until a last segment of the paging message.

10. The wireless device of claim 8, wherein the processor is configured not to monitor a subsequent subframe if the M2M extension flag indicates non-existence of the remaining segment of the paging message.

11. The wireless device of claim 8, wherein the extension flag is set to 0b0 to indicate that the wireless device checks the M2M extension flag.

12. The wireless device of claim 11, wherein the M2M extension flag is set to 0b1 to indicate that the remaining segment of the paging message exists.

13. The wireless device of claim 12, wherein the M2M extension flag is set to 0b0 to indicate that the received segment is the last segment of the paging message.

14. The wireless device of claim 8, wherein the identifier of the M2M device includes a Fixed M2M Deregistration Identifier (FMDID) that is a 16-bit value that uniquely identifies the wireless device in domain of a base station.

* * * * *